(12) United States Patent
Chen et al.

(10) Patent No.: US 10,944,989 B2
(45) Date of Patent: Mar. 9, 2021

(54) METHOD AND APPARATUS OF NON-SQUARE INTRA PREDICTION FOR CHROMA COMPONENTS IN CODING SYSTEM WITH QUAD-TREE AND BINARY-TREE PARTITION

(71) Applicant: MEDIATEK INC., Hsinchu (TW)

(72) Inventors: Yi-Wen Chen, Taichung (TW); Jicheng An, Beijing (CN); Jian-Liang Lin, Su'ao Township, Yilan County (TW); Yu-Wen Huang, Taipei (TW)

(73) Assignee: MEDIATEK INC., Hsinchu (TW)

( * ) Notice: Subject to any disclaimer, the term of this patent is extended or adjusted under 35 U.S.C. 154(b) by 127 days.

(21) Appl. No.: 15/561,110

(22) PCT Filed: Mar. 31, 2016

(86) PCT No.: PCT/CN2016/077961
§ 371 (c)(1),
(2) Date: Sep. 25, 2017

(87) PCT Pub. No.: WO2016/155641
PCT Pub. Date: Oct. 6, 2016

(65) Prior Publication Data
US 2018/0131962 A1 May 10, 2018

(30) Foreign Application Priority Data

Apr. 1, 2015 (WO) ................ PCT/CN2015/075672

(51) Int. Cl.
*H04N 19/593* (2014.01)
*H04N 19/96* (2014.01)
(Continued)

(52) U.S. Cl.
CPC ......... *H04N 19/593* (2014.11); *H04N 19/105* (2014.11); *H04N 19/122* (2014.11);
(Continued)

(58) Field of Classification Search
CPC .. H04N 19/593; H04N 19/105; H04N 19/122; H04N 19/157; H04N 19/176; H04N 19/186; H04N 19/96
(Continued)

(56) References Cited

U.S. PATENT DOCUMENTS 9,769,472 B2 9/2017 Liu et al.
2011/0255591 A1* 10/2011 Kim ..................... H04N 19/186
375/240.02

(Continued)

FOREIGN PATENT DOCUMENTS

CN 103733628 A 4/2014
CN 103748877 A 4/2014
(Continued)

OTHER PUBLICATIONS

Cao, X., et al.; "Short distance intra coding scheme for HEVC;" 2012 Picture Coding Symposium; May 2012; pp. 501-504.
(Continued)

*Primary Examiner* — Joseph G Ustaris
*Assistant Examiner* — Jimmy S Lee
(74) *Attorney, Agent, or Firm* — Oblon, McClelland, Maier & Neustadt, L.L.P.

(57) ABSTRACT

A method and apparatus for Intra prediction of non-square chroma blocks are disclosed. The system uses a block partitioning structure for partitioning a chroma block into one or more final sub-blocks including at least one non-square final sub-block using block partition recursively. The block partition either splits each given block into intermediate sub-blocks using one or more split modes including one binary split mode or applies no splitting to each given block. The block is treated as an initial given block and each intermediate sub-block is treated as one given block in a next recursion. Any given block that is not further split becomes
(Continued)

a final sub-block. After the final sub-blocks are determined, non-square Intra prediction is applied to each non-square final sub-block.

26 Claims, 6 Drawing Sheets

(51) Int. Cl.
*H04N 19/186* (2014.01)
*H04N 19/105* (2014.01)
*H04N 19/157* (2014.01)
*H04N 19/176* (2014.01)
*H04N 19/122* (2014.01)

(52) U.S. Cl.
CPC ......... *H04N 19/157* (2014.11); *H04N 19/176* (2014.11); *H04N 19/186* (2014.11); *H04N 19/96* (2014.11)

(58) Field of Classification Search
USPC .................................................. 375/240.12
See application file for complete search history.

(56) References Cited

U.S. PATENT DOCUMENTS

| | | | |
|---|---|---|---|
| 2012/0307894 A1* | 12/2012 | Chien .................. | H04N 19/176 375/240.12 |
| 2013/0039417 A1 | 2/2013 | Wang et al. | |
| 2013/0094776 A1* | 4/2013 | Lainema .............. | H04N 19/176 382/233 |
| 2013/0136175 A1* | 5/2013 | Wang ..................... | H04N 19/11 375/240.12 |
| 2013/0202029 A1* | 8/2013 | Lou ........................ | H04N 19/91 375/240.03 |
| 2014/0126633 A1* | 5/2014 | Lin ..................... | H04N 19/593 375/240.12 |
| 2014/0140404 A1 | 5/2014 | Liu et al. | |

FOREIGN PATENT DOCUMENTS

| | | |
|---|---|---|
| EP | 2 699 000 A1 | 2/2014 |
| WO | WO 2015/005418 A1 | 1/2015 |

OTHER PUBLICATIONS

Song, J., et al.; "A chroma coding scheme for SDIP mode;" Joint Collaborative Team on Video Coding (JCT-VC) of ITU-T SG16 WP3 and ISO/IEC JTC1/SC29/WG11; Jul. 2011; pp. 1-4.

Lin, Y., et al; "Modification to DC prediction in SDIP;" Joint Collaborative Team on Video Coding (JCT-VC) of ITU-T SG16 WP3 and ISO/IEC JTC1/SC29/WG11; Jul. 2011; pp. 1-4.

Wahadaniah, V., et al.; "Reference sample padding harmonization for intra DC mode;" Joint Collaborative Team on Video Coding (JCT-VC) of ITU-T SG16 WP3 and ISO/IEC JTC1/SC29/WG11; Jul. 2011; pp. 1-8.

International Search Report dated Jun. 14, 2016, issued in application No. PCT/CN2016/077961.

European Office Action dated May 11, 2020 in European Patent Application No. 16771396.5, 6 pages.

Lin, Y., et al.; "CE6.b Test6 Report of harmonization on Planer prediction in SDIP;" Joint Collaborative Team on Video Coding (JCT-VC) of ITU-T SG16 WP3 and ISO/IEC JTC1/SC29/WG11; Jul. 2011; pp. 1-3.

Cao, X., et al.; "CE6.c Report on Simplified of short Distance Intra Prediction Method;" Joint Collaborative Team on Video Coding (JCT-VC) of ITU-T SG16 WP3 and ISO/IEC JTC1/SC29/WG11; Nov. 2011; pp. 1-20.

Cao, X., et al. ; "CE6.c Report on Combination of SDIP and its Improvements;" Joint Collaborative Team on Video Coding (JCT-VC) of ITU-T SG16 WP3 and ISO/IEC JTC1/SC29/WG11; Nov. 2011; pp. 1-15.

Lim, et al.; "CE6.b Test4 LM mode harmonization on SDIP;" Joint Collaborative Team on Video Coding (JCT-VC) of ITU-T SG16 WP3 and ISO/IEC JTC1/SC29/WG11; Jul. 2011; pp. 1-5.

Lainema, J., et al.; "Simplified DC prediction;" Joint Collaborative Team on Video Coding (JCT-VC) of ITU-T SG16 WP3 and ISO/IEC JTC1/SC29/WG11; Nov. 2011; pp. 1-3.

Song, J., et al.; "CE6.c Report on SDIP chroma extension scheme;" Joint Collaborative Team on Video Coding (JCT-VC) of ITU-T SG16 WP3 and ISO/IEC JTC1/SC29/WG11; Nov. 2011; pp. 1-6.

Xu, J., et al.; "Non-CE6 Improvements for SDIP;" Joint Collaborative Team on Video Coding (JCT-VC) of ITU-T SG16 WP3 and ISO/IEC JTC1/SC29/WG11; Nov. 2011; pp. 1-4.

Wahadaniah, V., et al.; "AHG16:Reference sample Padding harmonization for intra DC mode;" Joint Collaborative Team on Video Coding (JCT-VC) of ITU-T SG16 WP3 and ISO/IEC JTC1/SC29/WG11; Nov. 2011; pp. 1-6.

Cao, X., et al.; "CE6.b1 Report on short distance intra prediction method;" Joint Collaborative Team on Video Coding (JCT-VC) of ITU-T SG16 WP3 and ISO/IEC JTC1/SC29/WG11; Mar. 2011; pp. 1-7.

\* cited by examiner

*Fig. 1*

PART_2N×2N

PART_2N×N

PART_N×2N

PART_N×N

PART_2N×nU

PART_2N×nD

PART_nL×2N

PART_nR×2N

Horizontal binary-tree split     Vertical binary-tree split     Quard-tree split

METHOD AND APPARATUS OF NON-SQUARE INTRA PREDICTION FOR CHROMA COMPONENTS IN CODING SYSTEM WITH QUAD-TREE AND BINARY-TREE PARTITION

CROSS REFERENCE TO RELATED APPLICATIONS

The present invention claims priority to PCT Patent Application, Serial No. PCT/CN2015/075672, filed on Apr. 1, 2015. The PCT Patent Application is hereby incorporated by reference in its entirety.

FIELD OF THE INVENTION

The present invention relates to video coding. In particular, the present invention relates to coding techniques associated with Intra prediction for chroma components in a video coding system using quad-tree and binary-tree partition.

BACKGROUND AND RELATED ART

Motion compensated inter-frame coding has been widely adopted in various coding standards, such as MPEG-1/2/4 and H.261/H.263/H.264/AVC. While motion-compensated inter-frame coding can effectively reduce bitrate for compressed video, Intra coding is required to compress the regions with high motion or scene changes. Besides, Intra coding is also used to process an initial picture or to periodically insert I-pictures or I-blocks for random access or for alleviation of error propagation. Intra prediction exploits the spatial correlation within a picture or within a picture region. In practice, a picture or a picture region is divided into blocks and the Intra prediction is performed on a block basis. Intra prediction for a current block can rely on pixels in neighboring blocks that have been processed. For example, if blocks in a picture or picture region are processed row by row first from left to right and then from top to bottom, neighboring blocks on the top and neighboring blocks on the left of the current block can be used to form Intra prediction for pixels in the current block. While any pixels in the processed neighboring blocks can be used for Intra predictor of pixels in the current block, very often only pixels of the neighboring blocks that are adjacent to the current block boundaries on the top and on the left are used.

The new High Efficiency Video Coding (HEVC) standard is also based on Inter/Intra prediction and transform coding with high-efficiency entropy coding. Unlike older coding standards, HEVC adopts flexible block structure for various processing stages in the coding process. These partitioned blocks for various processing stages correspond to coding unit (CU), prediction unit (PU) and transform unit (TU).

Coding Unit (CU) and Coding Tree Structure in HEVC

Figure 1:
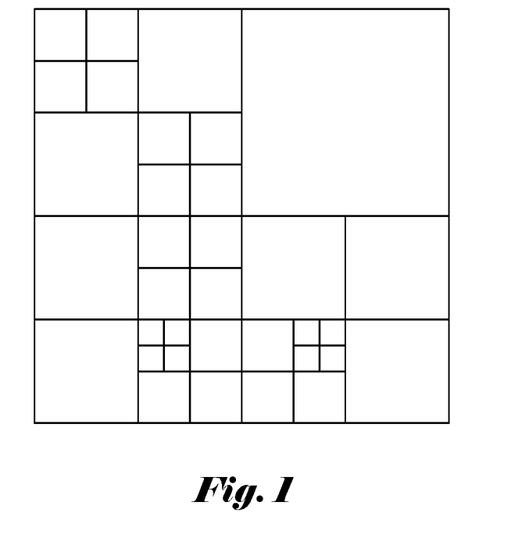
FIG. 1 illustrates an example of coding tree structure based on quad-tree partitioning based on existing HEVC (High Efficiency Video Coding) standard.

A coding tree unit (CTU) is partitioned into one or more coding units (CUs) using quadtree partitioning. Each CU is a square region corresponding to the leaf node of a quadtree partitioning of the CTU. Pixels in each CU share the same prediction mode, i.e., Intra, Inter or Skip mode. The quad-tree partitioning structure allows recursive splitting into four equally sized nodes, starting from the CTU as illustrated in FIG. 1. The process enables content-adaptive coding tree structure comprising of one or more CUs. Each CU may be as large as the CTU or as small as a smallest CU (e.g. 8×8 for HEVC). Each non-Skip coded CU is assigned to one of two prediction modes: Intra prediction or Inter prediction. A Skip mode is considered as an Inter prediction mode that does not signal the motion information and the residual information.

Prediction Unit (PU) Structure in HEVC

The prediction unit (PU) is a region intended for the prediction process. The PU is generated by partitioning the CU. In general, the PU is not restricted to be square in shape to allow partitioned PUs to match the boundaries of real objects in the picture.

Figure 2:
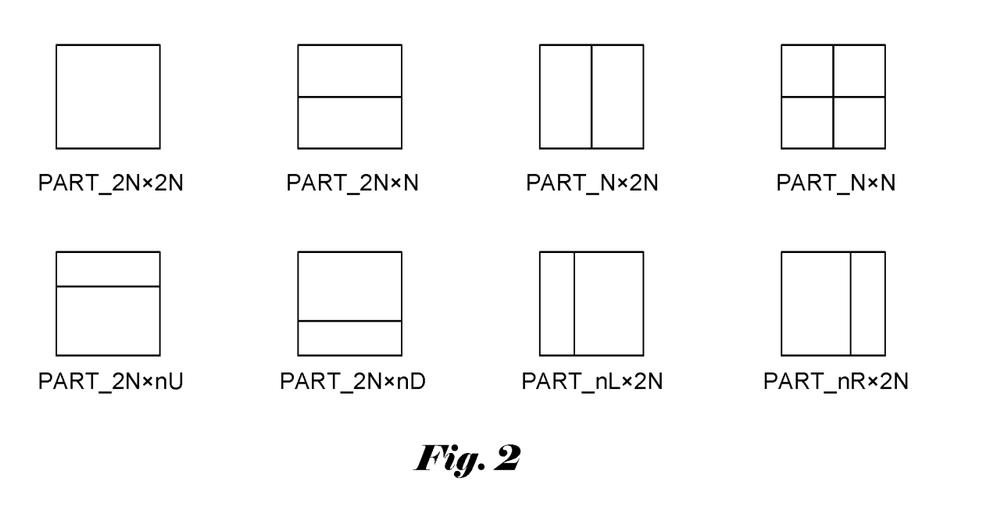
FIG. 2 illustrates 8 partition modes for prediction units (PUs) coded in the Inter mode in HEVC (High Efficiency Video Coding).

Each CU may be partitioned into two or four PUs depending on the partition mode. FIG. 2 illustrates the eight partition modes that may be used to define the PUs for an Inter-coded CU according to HEVC. The partitions in the upper row correspond to symmetric partitioning and the partitions in the lower correspond to asymmetric partitioning. The PART_2N×2N and PART_N×N partition modes are used for an intra-coded CU. The partition mode PART_N×N is allowed only when the corresponding CU size is equal to the minimum CU size. In general, the maximum PU size allowed is 64×64 and the smallest allowed PU size is 4×4. However, in order to reduce the memory bandwidth of motion compensation, the 4×4 block size is not allowed for the Inter-coded PU.

Transform Unit (TU) and Transform Tree Structure in HEVC

The transform unit (TU) is a square region, defined by quad-tree partitioning of the CU, which shares the same transform and quantization processes. The TU shape is always square and allowed TU size is from 32×32 down to 4×4. The maximum quad-tree depth is adjustable and is specified in the slice header syntax.

Intra Prediction in HEVC

Figure 3:
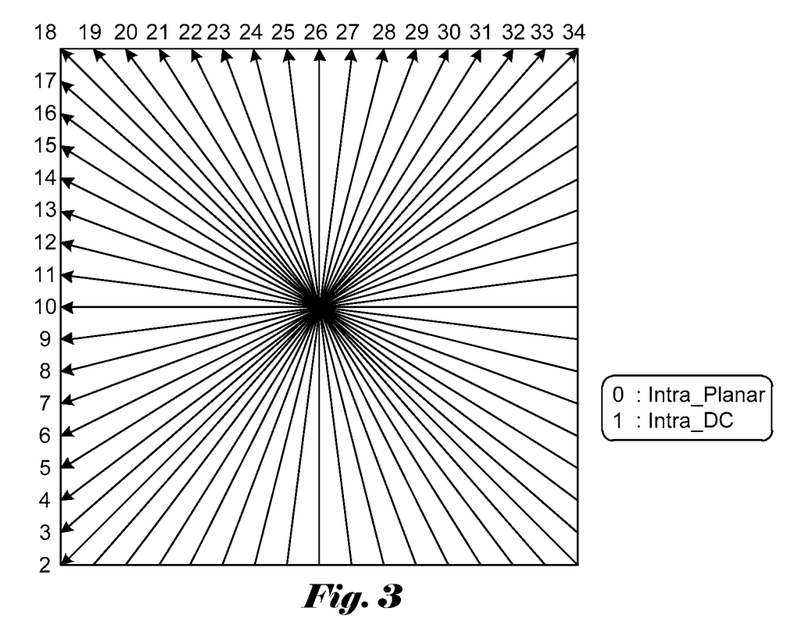
FIG. 3 illustrates the mapping between Intra prediction directions and Intra prediction mode numbers according to HEVC (High Efficiency Video Coding).

The decoded boundary samples of adjacent blocks are used as reference data for spatial prediction in regions where Inter picture prediction is not performed. All TUs within a PU use the same associated Intra prediction mode for the luma component and the chroma components. The Intra prediction process is performed at TU level. In other words, each TU uses its immediately adjacent reconstructed pixels to generate the predictors. The encoder selects the best luma Intra prediction mode of each PU from 35 options including 33 directional prediction modes, a DC mode and a Planar mode. The mapping between the Intra prediction direction and the Intra prediction mode number is specified in FIG. 3.

For the chroma component of an Intra PU, the encoder selects the best chroma prediction modes among five modes including Planar, DC, Horizontal, Vertical and a direct copy of the Intra prediction mode for the luma component (also called derived mode or DM mode).

When the Intra prediction mode number for the chroma component is not 4 and it is identical to the Intra prediction mode number for the luma component, the Intra prediction direction of 34 is used for the Intra prediction sample generation for the chroma component.

Similar to DM mode, another mode called the luma-predict-chroma mode (i.e., LM mode) takes advantage of the inter-channel correlation. However, for the DM mode, the chroma block uses the same Intra prediction mode as the corresponding luma block. For the LM mode, the Intra predictor for the chroma block is generated based on the reconstructed samples of the corresponding luma block. The LM mode is not adopted by the existing HEVC coding standard. Nevertheless, it is a useful coding tool for improving coding efficiency.

Figure 4:
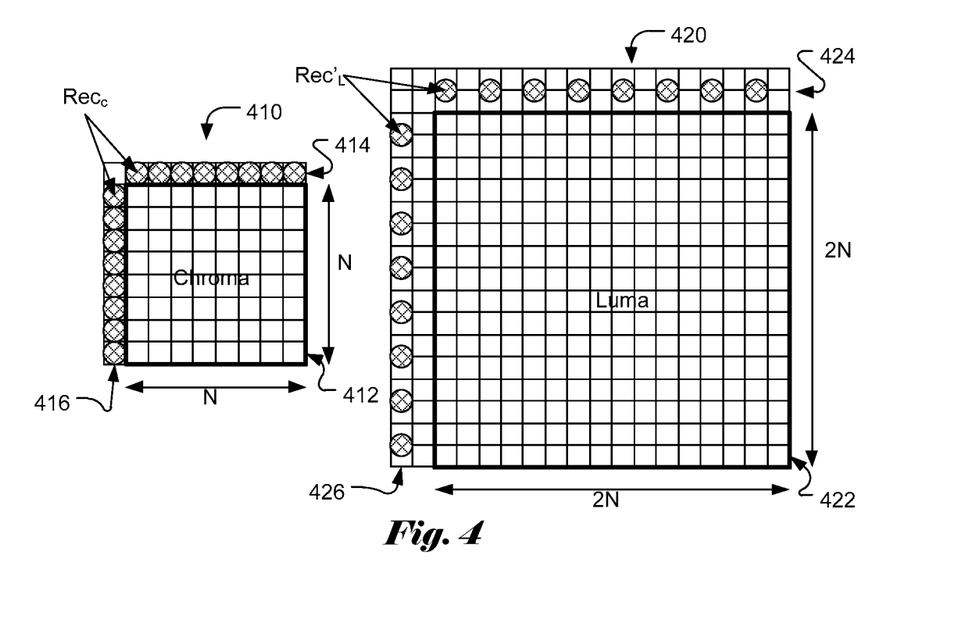
FIG. 4 illustrates an example of Intra prediction for the chroma blocks using a luma-predict-chroma mode (i.e., LM mode), where Intra prediction for the chroma component is derived from the reconstructed luma samples of a collocated luma block.

FIG. 4 illustrates an example of LM Intra prediction mode for generating Intra predictor for the chroma block based on reconstructed luma block. Block 410 represents a current chroma block 412 along with neighboring reconstructed samples (414 and 416). Block 420 represents a current luma block 422 along with neighboring reconstructed samples (424 and 426).

As shown in FIG. 4, chroma predictor, $\text{Pred}_C[x,y]$ according to the LM mode is predicted from reconstructed luma, $\text{Rec}'_L[x,y]$ using equation (1).

$$\text{Pred}_C[x,y] = \alpha \cdot \text{Rec}_L'[x,y] + \beta. \tag{1}$$

In the above equation, Intra prediction parameters $\alpha$ and $\beta$ associated with the LM Intra prediction mode are derived from causal reconstructed samples around the current block. For non-4:4:4 color formats, such as YCbCr4:2:0 color format, the luma samples need to be down-sampled before being used as predictors for corresponding chroma samples. Parameters $\alpha$ and $\beta$ are derived according to equations (2) and (3), which correspond to the least square solution. In the follow equations, $\text{Rec}_C$ is the vector of reconstructed chroma samples around the current chroma block, $\text{Rec}'_L$ the vector of down-sampled reconstructed luma samples around the current luma block, and $I$ is the number of used neighboring samples around current block.

$$\alpha = \frac{I \cdot \sum_{i=0}^{I} \text{Rec}_C(i) \cdot \text{Rec}'_L(i) - \sum_{i=0}^{I} \text{Rec}_C(i) \cdot \sum_{i=0}^{I} \text{Rec}'_L(i)}{I \cdot \sum_{i=0}^{I} \text{Rec}'_L(i) \cdot \text{Rec}'_L(i) - \left(\sum_{i=0}^{I} \text{Rec}'_L(i)\right)^2} = \frac{A_1}{A_2} \tag{2}$$

$$\beta = \frac{\sum_{i=0}^{I} \text{Rec}_C(i) - \alpha \sum_{i=0}^{I} \text{Rec}'_L(i)}{I} \tag{3}$$

There are also some variant LM modes. The LM parameters $\alpha$ and $\beta$ can be selectively generated by different sets of neighboring reconstructed pixels.

Inter Prediction in HEVC

Each Inter coded PU has a set of motion parameters consisting of motion vector, reference picture index and reference picture list usage flag. These motion parameters are used for generating Inter prediction samples. These motion parameters can be signaled in an explicit or implicit manner. When a CU is coded in the Skip mode, the CU is represented as one PU that has no significant transform coefficients. On the other hand, the motion parameters are not signaled either. The motion parameters such as motion vectors, reference picture index and reference picture list usage flag are obtained by Merge mode. The Merge mode is to find the neighboring Inter coded PU, the motion parameters (motion vector, reference picture index, and reference picture list usage flag) of the merged PU can be inferred as the motion parameters for the current PU. The encoder can select the best inferred motion parameters from multiple candidates formed by spatial neighboring PUs and temporal neighboring PUs. The encoder then transmits the corresponding index indicating the chosen candidate. The Merge mode can be applied not only to Skip mode PU, but also to any Inter coded PU. For Inter coded PUs, the encoder can use Merge mode or explicit signaling motion parameters. When motion parameters are signaled explicitly, the motion vector, corresponding reference picture index for each reference picture list and reference picture list usage flag are signaled explicitly for each PU. For Inter coded PU, significant transform coefficients are sent to decoder.

In HEVC, the luma component and two chroma components share the same CU splitting structure. PU structures, prediction modes and prediction parameters (e.g. motion vectors and reference index) are also shared between luma and chroma components when the current CU is coded in the Inter mode. However, when the current CU is coded in the Intra mode, PU partition and Intra prediction modes can be different for luma and chroma components, respectively. In particular, for an Intra coded CU, the PU for luma component can be either 2N×2N or N×N. However, the PU for chroma component can only be 2N×2N.

The Intra prediction for the chroma components in the existing coding standard or practice is rather restricted. It is desirable to develop techniques for improving the Intra prediction coding structure and prediction efficiency of chroma components.

BRIEF SUMMARY OF THE INVENTION

A method and apparatus for Intra prediction of non-square chroma blocks are disclosed. The system uses a block partitioning structure for partitioning a chroma block into one or more final sub-blocks including at least one non-square final sub-block using block partition recursively. The block partition either splits each given block into intermediate sub-blocks using one or more split modes including one binary split mode or applies no splitting to each given block. The block is treated as an initial given block and each intermediate sub-block is treated as one given block in a next recursion. Any given block that is not further split becomes a final sub-block. After the final sub-blocks are determined, non-square Intra prediction is applied to each non-square final sub-block.

One aspect of the invention addresses block partition. The block partition may correspond to combined quad and binary partition that splits each given block into intermediate sub-blocks using quad split, horizontal binary split or vertical binary split, or applies no split to each given block. The block partitioning structure may be applied to the coding tree unit (CTU) to partition it into coding units (CUs). The block partitioning structure may be applied to the coding unit (CU) to partition it into prediction units (PUs). Furthermore, the CU may also be partitioned into transform units (TUs) using the same block partitioning structure as for the PUs.

Another aspect of the invention addresses techniques to adapt the Intra prediction based on square block for non-square Intra prediction. In one embodiment, X additional neighboring reconstructed samples are included or X neighboring reconstructed samples are excluded for deriving DC predictor associated with DC Intra predictor mode or deriving Intra prediction parameters associated with LM Intra prediction mode. The length of each side of a non-square final sub-block is a power-of-2 integer. X is set to the difference between the lengths of the long side and the short side of a non-square final sub-block. X additional neighboring reconstructed samples may come from extended neighboring reconstructed samples in line with neighboring reconstructed samples on the short side of each non-square final sub-block. The X additional neighboring reconstructed samples may also come from a line of reconstructed samples adjacent to neighboring reconstructed samples on the short side of each non-square final sub-block. On the other hand, the X neighboring reconstructed samples to be excluded may be from X-consecutive neighboring reconstructed samples on the long-side of each non-square final sub-block. The X neighboring reconstructed samples to be excluded may also be selected in an interleaved manner from neighboring reconstructed samples on the long side of each non-square final sub-block.

In yet another embodiment, DC predictor derivation associated with DC Intra predictor mode or Intra prediction parameters derivation associated with LM Intra prediction mode can be based only on neighboring reconstructed samples of the long side of each non-square final sub-block or only on neighboring reconstructed samples of the short side of each non-square final sub-block.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

As mentioned before, the current HEVC only allows 2N×2N Intra prediction for the chroma component. Such restriction may limit the coding efficiency for the chroma component. Accordingly, the present invention allows other Intra prediction modes for the chroma component. In particular, the present invention enables non-square Intra prediction for chroma components to achieve higher coding performance.

The non-square Intra prediction can be realized by enabling various partition modes for chroma components in the Intra coded CU. The enabled partition modes are not limited to the 8 partition modes as shown in FIG. 2. When multiple partition modes are allowed for the chroma component according to the present invention, the selected partition mode needs to be signaled for each Intra chroma CU.

In one embodiment, the non-square intra prediction can be realized by enabling non-square CU for Intra chroma prediction. The non-square CU can be in any rectangular shape with non-equal width and height, and both width and height are power-of-2 integers.

Yet in another embodiment, the non-square Intra prediction can be realized by enabling non-square transform. The non-square transform unit can be in any rectangular shape with non-equal width and height, and both width and height are power-of-2 integers.

Figure 5:
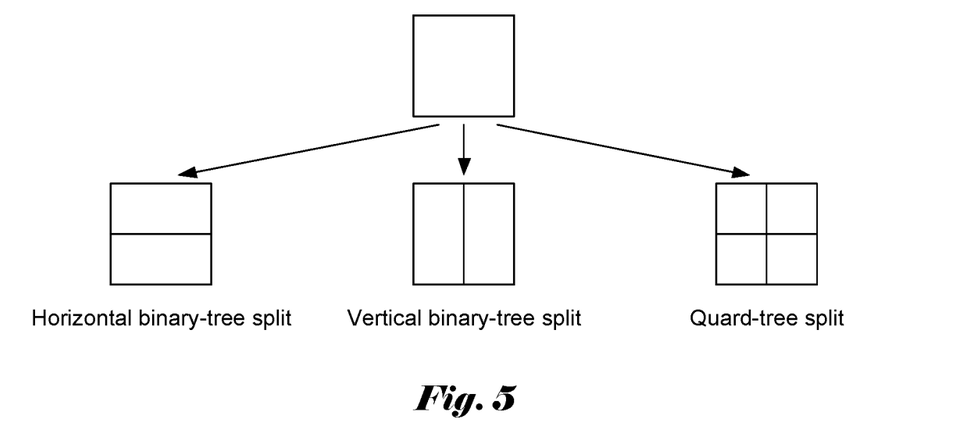
FIG. 5 illustrates an example of block partition using quad-tree split, horizontal binary split and vertical binary split.

FIG. 5 illustrates an example of combined quad and binary block partition using quad split, horizontal binary split and vertical binary split. The combined quad and binary block partition can be applied to form various block structure for the coding process. For example, each CTU or CU can be split into smaller CUs using the combined quad and binary block partition as shown in FIG. 5. With the binary split, CU can be in non-square shapes. When PU and TU are both equal to CU, the chroma components prediction and transform for Intra CU will be performed for non-square blocks.

As is known in the field, the partition process is applied recursively. When a block is split, the block is split into multiple sub-blocks. At the next partition level, the partition process treats each sub-block as a block and applies block splitting. The block partition process may also decide not to split a block for various reasons, such as that the splitting doesn't further improve coding efficiency or the block has reached a smallest block size. When the block partition process finishes, a set of final sub-blocks will be generated. The block partition process may be described by a partition tree, where the root of the tree corresponds to the initial block and the nodes or leaves of the tree are the final sub-blocks. For example, when the block partition process is applied to the CTU (i.e., root of the tree), the resulting final sub-blocks correspond to the CUs. When the block partition includes a binary partition, such as the combined quad and binary block partition, the block partition may result in a non-square final sub-block. Therefore, the above process may result in a non-square chroma CU. For the 2N×N or N×2N non-square chroma coding unit, it will be further divided into two N×N transform units (TUs).

The above block partition may also be applied to a chroma CU to partition the chroma CU into one or more chroma PUs. When the block partition includes a binary partition, such as the combined quad and binary block partition, the block partition may result in a non-square final sub-block. Therefore, the above process may result in a non-square chroma PU. For the 2N×N or N×2N non-square prediction unit, it will be further divided into two N×N transform units.

To support non-square Intra prediction for chroma components, modifications may be required for Intra prediction process of existing chroma Intra modes. The modifications are described as follows.

Figure 6:
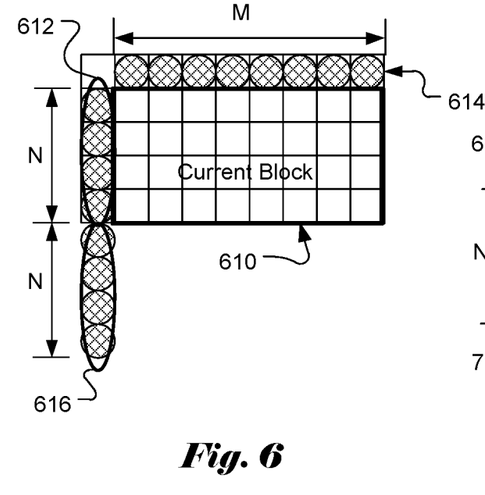
FIG. 6 illustrates an example of including additional neighboring reconstructed samples from the short side of the current block according to an embodiment of the present invention.

When the current Intra chroma block is non-square (e.g. M×N, M≠N), the DC Intra prediction mode is modified to ensure the number of the number of samples used to derive the averaged neighboring reconstructed value (i.e., the DC predictor) will be a power-of-2 integer. According to embodiments of the present invention, this can achieved by including additional samples or excluding samples for DC calculation. For the DC mode, the prediction is formed based on the average value of the neighboring reconstructed pixels above the current block and the neighboring reconstructed pixels at the left boundary of the current block. With the above modifications, the process of calculating the average can then be done by a shift operation instead of the division operation. FIG. 6 illustrates an example of including additional X samples (616) for calculating the DC predictor for a current chroma block (610). In FIG. 6, the neighboring reconstructed samples (612) at the short side and the neighboring reconstructed samples (614) at the long side of the non-square block may be used for calculating the DC predictor. However, the total number of the neighboring reconstructed samples (612) at the short side and the neighboring reconstructed samples (614) at the long side of the non-square block is not a power-of-2 integer. The DC predictor calculation will require a division operation. According to embodiments of the present invention, additional samples are included to the total number for DC predictor calculation to be a power-of-2 integer. In one embodiment, the X samples corresponding to extended neighboring reconstructed samples along the short side of the current block, where X is equal to the length of the long side minus the length of the short side. As shown in FIG. 6, the extended neighboring reconstructed samples are in line with the existing neighboring reconstructed sample on the short side. While the example in FIG. 6 shows a non-square block with the short side in the vertical direction, the processing for a non-square block with the short side in the horizontal direction can be derived similarly. Furthermore, while the example in FIG. 6 shows an example of non-square block with the length of the long side twice as long as the length of the short side, the present invention can be applied to non-square blocks of other sized, such as the length of the long side equal 16 and the length of the short side equal to 4.

Figure 7:
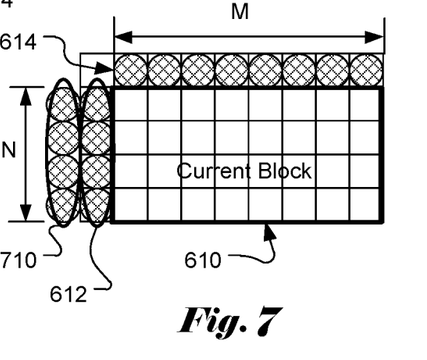
FIG. 7 illustrates an example of including additional neighboring reconstructed samples from the second line of the short side of the current block for DC calculation according to another embodiment of the present invention.

In another example, additional samples may come from the second lines (710) adjacent to the neighboring reconstructed samples of the short side as shown in FIG. 7. Again, while the example in FIG. 7 shows a non-square block with the short side in the vertical direction, the processing for a non-square block with the short side in the horizontal direction can be derived similarly.

In another example, X can be any number to ensure the number of the samples used to calculate the DC value will be a power-of-2 integer and the additional samples can be any subset of the neighbor reconstructed pixels.

Figure 8:
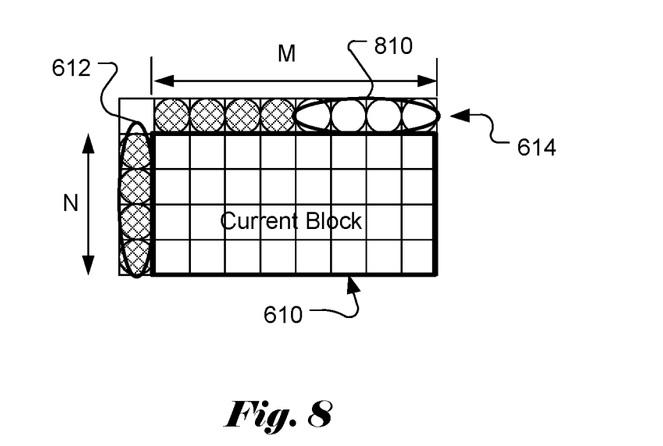
FIG. 8 illustrates an example of excluding consecutive neighboring reconstructed samples from the long side of the current block for DC calculation according to an embodiment of the present invention.
Figure 9:
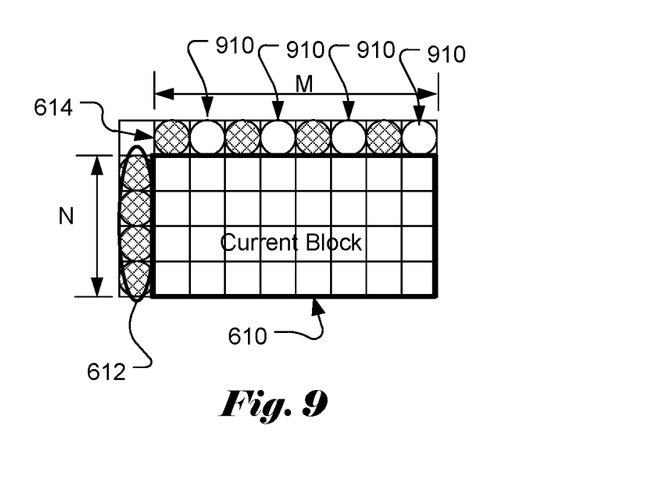
FIG. 9 illustrates an example of excluding neighboring reconstructed samples by skipping neighboring reconstructed samples in the long side of the current block for DC calculation according to an embodiment of the present invention.

In another embodiment, some neighboring reconstructed samples around the current block are excluded from calculating the DC value in order to simplify the DC predictor calculation. For example, X samples from the neighboring reconstructed samples around the long side of the current block can be excluded from the DC calculation, where X is equal to the length of the long side minus the length of the short side. As shown in FIG. 8, X consecutive neighboring reconstructed samples (810) are excluded from the long side of current block for the DC predictor calculation. In another example, X neighboring reconstructed samples (910) are excluded from the DC predictor calculation by skipping X samples in the long side of current block in an interleaved manner. If the long side is twice as long as the short side, X samples can be excluded by skipping every other samples as shown in FIG. 9. In another example, X can be any number to ensure that the number of the samples used to calculate the DC value will be power of 2 and the removed samples can be any subset of the neighbor reconstructed pixels. Again, while the examples in FIG. 8 and FIG. 9 show a non-square block with the short side in the vertical direction, the processing for a non-square block with the short side in the horizontal direction can be derived similarly.

In another embodiment, the DC predictor value can be calculated as the average of the DC predictor value of above samples and the DC predictor value of the left samples. If both the lengths of the long side and the short side are power of 2, the shift operation can be used to calculate the DC predictor value of above samples and the DC predictor value of the left samples without the need of the division operation. Again, the shift operation can be used to calculate the average of the DC predictor value of above samples and the DC predictor value of the left samples.

When current intra chroma block is non-square (e.g. M×N and M≠N), the Intra prediction process for the LM mode is modified to ensure that the number of the samples used to derive the LM parameters α and β will be power of 2 by including additional samples or excluding samples for LM parameters derivation. With the proposed modifications, the process of LM parameter derivation can then be done by the shift operation instead of the division operation. In one embodiment, addition neighboring reconstructed samples are included to derive the LM parameters α and β. For example, additional X neighboring reconstructed samples along the short side of current block can be used to derive the LM parameters as shown in FIG. 6, where X is equal to the length of the long side minus the length of the short side. In another example, additional neighboring reconstructed samples can be the second lines adjacent to the neighboring reconstructed of the short side as shown in FIG. 7. In another example, X can be any number to ensure the number of the samples used to derive the LM parameters will be power of 2 and the additional samples can be any subset of the neighbor reconstructed pixels.

Figure 10:
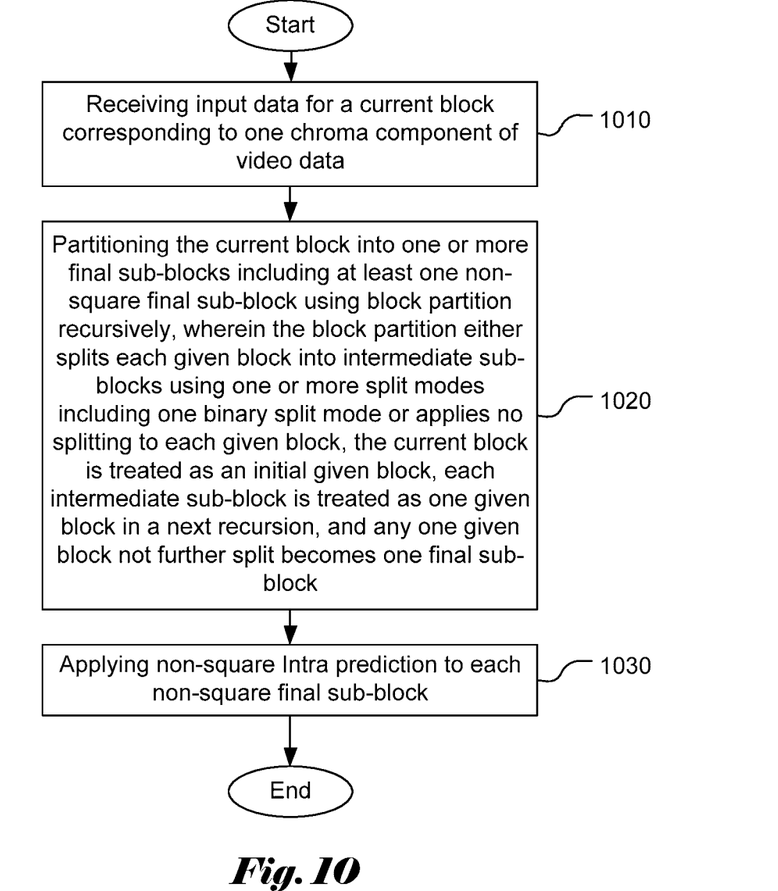
FIG. 10 illustrates an exemplary flowchart for an encoder system incorporating an embodiment of the present invention to apply Intra prediction to non-square chroma blocks.

In another embodiment, some neighboring reconstructed samples around the current block are excluded from deriving the LM parameters α and β. For example, X consecutive neighboring reconstructed samples from the neighboring reconstructed samples around the current block can be excluded from deriving the LM parameters α and β, where X is equal to the length of the long side minus the length of the short side. As shown in FIG. 8, X neighboring reconstructed samples are removed from the long side of current block. In another example, X samples are excluded from deriving the LM parameters α and β by skipping X neighboring reconstructed samples in the long side of current block in an interleaved fashion. If the long side is twice as long as the short side, X samples can be excluded by skipping every other samples as shown in FIG. 9. In another example, X can be any number to ensure that the number of the samples used to derive the LM parameters α and β will be power of 2 and the removed samples can be any subset of the neighbor reconstructed pixels FIG. 10 illustrates an exemplary flowchart for an encoder system incorporating an embodiment of the present invention to apply Intra prediction to non-square chroma blocks. The system receives input data for a current block corresponding to one chroma component of video data as shown in step 1010. The system then partitions the current block into one or more final sub-blocks including at least one non-square final sub-block using block partition recursively in step 1020. The block partition either splits each given block into intermediate sub-blocks using one or more split modes including one binary split mode or applies no splitting to each given block. The current block is treated as an initial given block, each intermediate sub-block is treated as one given block in a next recursion, and any one given block not further split becomes one final sub-block. The system applies non-square Intra prediction to each non-square final sub-block in step 1030.

Figure 11:
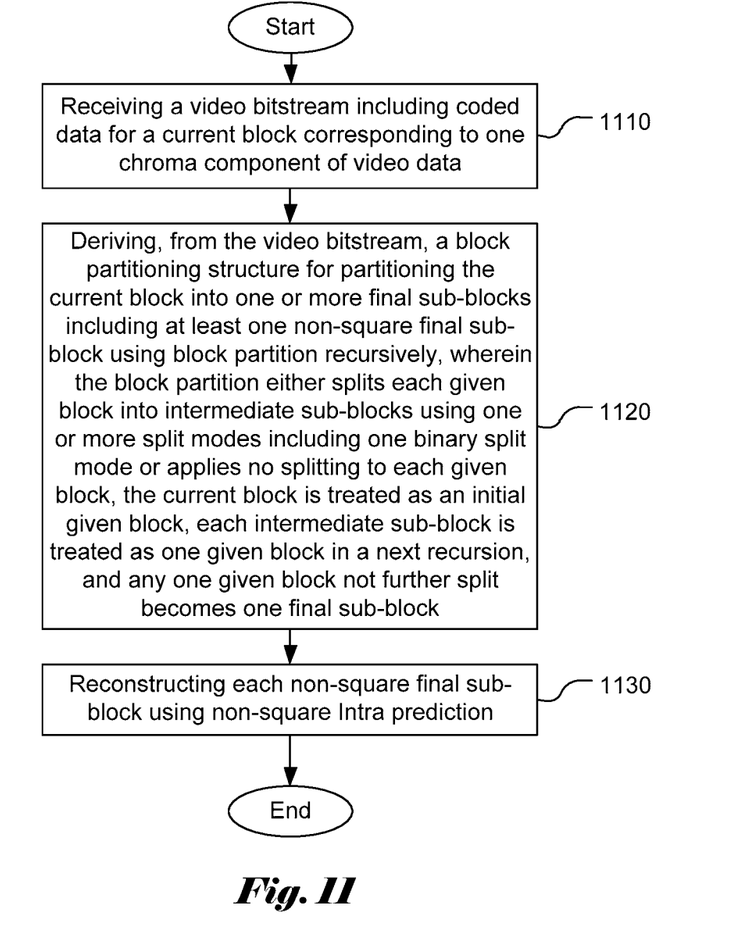
FIG. 11 illustrates an exemplary flowchart for a decoder system incorporating an embodiment of the present invention to apply Intra prediction reconstruction to non-square chroma blocks.

FIG. 11 illustrates an exemplary flowchart for a decoder system incorporating an embodiment of the present invention to apply Intra prediction reconstruction to non-square chroma blocks. The system receives a video bitstream including coded data for a current block corresponding to one chroma component of video data in step 1110. The system then derives from the video bitstream a block partitioning structure for partitioning the current block into one or more final sub-blocks including at least one non-square final sub-block using block partition recursively in step 1120. The block partition either splits each given block into intermediate sub-blocks using one or more split modes including one binary split mode or applies no splitting to each given block. The current block is treated as an initial given block, each intermediate sub-block is treated as one given block in a next recursion, and any one given block not further split becomes one final sub-block. The system then reconstructs each non-square final sub-block using non-square Intra prediction in step 1130.

The flowcharts shown above are intended to illustrate examples of enabling chroma Intra prediction for non-square blocks in a video encoder and a decoder incorporating embodiments of the present invention. A person skilled in the art may modify each step, re-arranges the steps, split a step, or combine the steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video decoding using Intra prediction for video data comprising:
   receiving a video bitstream including coded data for a current block;
   deriving, from the video bitstream, a block partitioning structure for partitioning the current block into one or more final sub-blocks including at least one non-square final sub-block using block partition recursively, wherein the block partition either splits each given block into intermediate sub-blocks using one or more split modes including one binary split mode or applies no splitting to each given block, the current block is treated as an initial given block, each intermediate sub-block is treated as one given block in a next recursion, and any one given block not further split becomes one final sub-block; and
   reconstructing each non-square final sub-block using non-square Intra prediction by including X additional neighboring reconstructed samples or excluding X neighboring reconstructed samples for deriving DC predictor associated with DC Intra predictor mode, and/or including Y additional neighboring reconstructed samples or excluding Y neighboring reconstructed samples for deriving Intra prediction parameters associated with LM (luma-predict-chroma) Intra prediction mode, wherein X and Y are positive integers,
   wherein each non-square final sub-block has neighboring reconstructed samples along a short side and a long side of each non-square final sub-block, wherein at least one of a first length of the long side of each non-square final sub-block and a second length of the short side of each non-square final sub-block is a power-of-2 integer, wherein X or Y equals the first length of the long side of each non-square final sub-block minus the second length of the short side of each non-square final sub-block, wherein said reconstructing each non-square final sub-block using non-square Intra prediction comprises deriving DC predictor associated with DC Intra predictor mode based only on neighboring reconstructed samples of the long side of each non-square final sub-block, and wherein the DC predictor is a value that is an average of the neighboring reconstructed samples of the long side.

2. The method of claim 1, wherein the block partition corresponds to combined quad and binary partition that splits each given block into intermediate sub-blocks using quad split, horizontal binary split or vertical binary split, or applies no split to each given block.

3. The method of claim 1, wherein the current block corresponds to one coding tree unit (CTU) and said one or more final sub-blocks correspond to one or more coding units (CUs) wherein pixels in each CU share common coding information.

4. The method of claim 1, wherein the current block corresponds to one coding unit (CU) and said one or more final sub-blocks correspond to one or more prediction units (PUs) wherein pixels in each CU share common coding information and pixels in each PU share common prediction information.

5. The method of claim 4, wherein if a non-square PU corresponds to a 2N×N or N×2N block, the non-square PU is partitioned into N×N transform units (TUs), wherein transform processing is applied to each transform unit (TU).

6. The method of claim 4, wherein each coding unit (CU) is also partitioned into one or more transform units (TUs) according to a same block partition tree as said one or more prediction units (PUs), and wherein transform process is applied to each transform unit.

7. The method of claim 1, wherein the X or Y additional neighboring reconstructed samples are from extended neighboring reconstructed samples in line with neighboring reconstructed samples on the short side of each non-square final sub-block.

8. The method of claim 1, wherein the X or Y additional neighboring reconstructed samples are from a line of reconstructed samples adjacent to neighboring reconstructed samples on the short side of each non-square final sub-block.

9. The method of claim 1, wherein the X or Y neighboring reconstructed samples to be excluded are from X-consecutive neighboring reconstructed samples on the long side of each non-square final sub-block.

10. The method of claim 1, wherein the X or Y neighboring reconstructed samples to be excluded are selected in an interleaved manner from neighboring reconstructed samples on the long side of each non-square final sub-block.

11. The method of claim 1, wherein said reconstructing each non-square final sub-block using non-square Intra prediction further comprises deriving Intra prediction parameters associated with LM Intra prediction mode based only on specific neighboring chroma reconstructed samples, wherein the specific neighboring chroma reconstructed samples are selected from neighboring reconstructed samples along the short side and the long side of each non-square final sub-block, and a number of the specific neighboring chroma reconstructed samples is power-of-2.

12. The method of claim 1, wherein said reconstructing each non-square final sub-block using non-square Intra prediction comprises deriving DC predictor associated with DC Intra predictor mode or deriving Intra prediction parameters associated with LM Intra prediction mode based only on neighboring reconstructed samples of the short side of each non-square final sub-block, wherein the second length of the short side of each non-square final sub-block is a power-of-2 integer.

13. A method of video coding using Intra prediction video data, comprising:
receiving input data for a current block;
partitioning the current block into one or more final sub-blocks including at least one non-square final sub-block using block partition recursively, wherein the block partition either splits each given block into intermediate sub-blocks using one or more split modes including one binary split mode or applies no splitting to each given block, the current block is treated as an initial given block, each intermediate sub-block is treated as one given block in a next recursion, and any one given block not further split becomes one final sub-block; and
applying non-square Intra prediction to each non-square final sub-block by including X additional neighboring reconstructed samples or excluding X neighboring reconstructed samples for deriving DC predictor associated with DC Intra predictor mode, and/or including Y additional neighboring reconstructed samples or excluding Y neighboring reconstructed samples for deriving Intra prediction parameters associated with LM (luma-predict-chroma) Intra prediction mode, wherein X and Y are positive integers,
wherein each non-square final sub-block has neighboring reconstructed samples along a short side and a long side of each non-square final sub-block, wherein at least one of a first length of the long side of each non-square final sub-block and a second length of the short side of each non-square final sub-block is a power-of-2 integer, wherein X or Y equals the first length of the long side of each non-square final sub-block minus the second length of the short side of each non-square final sub-block, wherein said applying non-square Intra prediction to each non-square final sub-block comprises deriving DC predictor associated with DC Intra predictor mode based only on neighboring reconstructed samples of the long side of each non-square final sub-block, and wherein the DC predictor is a value that is an average of the neighboring reconstructed samples of the long side.

14. The method of claim 13, wherein the block partition corresponds to combined quad and binary partition that splits each given block into intermediate sub-blocks using quad split, horizontal binary split or vertical binary split, or applies no split to each given block.

15. The method of claim 13, wherein the current block corresponds to one coding tree unit (CTU) and said one or more final sub-blocks correspond to one or more coding units (CUs) wherein pixels in each CU share common coding information.

16. The method of claim 15, wherein if a non-square CU corresponds to a 2N×N or N×2N block, the non-square CU is partitioned into N×N transform units (TUs), wherein transform processing is applied to each transform unit (TU).

17. The method of claim 13, wherein the current block corresponds to one coding unit (CU) and said one or more final sub-blocks correspond to one or more prediction units (PUs) wherein pixels in each CU share common coding information and pixels in each PU share common prediction information.

18. The method of claim 17, wherein each coding unit (CU) is also partitioned into one or more transform units (TUs) according to a same block partition tree as said one or more prediction units (PUs), and wherein transform process is applied to each transform unit.

19. The method of claim 17, wherein if a non-square PU corresponds to a 2N×N or N×2N block, the non-square PU is partitioned into N×N transform units (TUs), wherein transform processing is applied to each transform unit (TU).

20. The method of claim 13, wherein the X or Y additional neighboring reconstructed samples are from extended neighboring reconstructed samples in line with neighboring reconstructed samples on a short side of each non-square final sub-block.

21. The method of claim 13, wherein the X or Y additional neighboring reconstructed samples are from a line of reconstructed samples adjacent to neighboring reconstructed samples on a short side of each non-square final sub-block.

22. The method of claim 13, wherein the X or Y neighboring reconstructed samples to be excluded are from X-consecutive neighboring reconstructed samples on the long side of each non-square final sub-block.

23. The method of claim 13, wherein the X or Y neighboring reconstructed samples to be excluded are selected in an interleaved manner from neighboring reconstructed samples on the long side of each non-square final sub-block.

24. The method of claim 13, wherein said applying the non-square Intra prediction to each non-square final sub-block further comprises deriving Intra prediction parameters associated with LM Intra prediction mode based only on specific neighboring chroma reconstructed samples, wherein the specific neighboring chroma reconstructed samples are selected from neighboring reconstructed samples along a short side and the long side of each non-square final sub-block, and a number of the specific neighboring chroma reconstructed samples is power-of-2.

25. The method of claim 13, wherein said applying the non-square Intra prediction to each non-square final sub-block comprises deriving DC predictor associated with DC Intra predictor mode or deriving Intra prediction parameters associated with LM Intra prediction mode based only on neighboring reconstructed samples of a short side of each non-square final sub-block, wherein the second length of the short side of each non-square final sub-block is a power-of-2 integer.

26. An apparatus for video decoding using Intra prediction for video data, comprising one or more electronic circuitries arranged to:
receive a video bitstream including coded data for a current block;
derive, from the video bitstream, a block partitioning structure for partitioning the current block into one or more final sub-blocks including at least one non-square final sub-block using block partition recursively, wherein the block partition either splits each given block into intermediate sub-blocks using one or more split modes including one binary split mode or applies no splitting to each given block, the current block is treated as an initial given block, each intermediate sub-block is treated as one given block in a next recursion, and any one given block not further split becomes one final sub-block; and
reconstruct each non-square final sub-block using non-square Intra prediction by including X additional neighboring reconstructed samples or excluding X neighboring reconstructed samples for deriving DC predictor associated with DC Intra predictor mode, and/or including Y additional neighboring reconstructed samples or excluding Y neighboring reconstructed samples for deriving Intra prediction parameters associated with LM (luma-predict-chroma) Intra prediction mode, wherein X and Y are positive integers,
wherein each non-square final sub-block has neighboring reconstructed samples along a short side and a long side of each non-square final sub-block, wherein at least one of a first length of the long side of each non-square final sub-block and a second length of the short side of each non-square final sub-block is a power-of-2 integer, wherein X or Y equals the first length of the long side of each non-square final sub-block minus the second length of the short side of each non-square final sub-block, wherein said reconstructing each non-square final sub-block using non-square Intra prediction comprises deriving DC predictor associated with DC Intra predictor mode based only on neighboring reconstructed samples of the long side of each non-square final sub-block, and wherein the DC predictor is a value that is an average of the neighboring reconstructed samples of the long side.

* * * * *